F. A. GERCICH ET AL

Oct. 27, 1931. KINDLING BURNER INSTALLATION Re. 18,235

Original Filed Dec. 8, 1927

INVENTORS
FREDERICK A. GERCICH
AND WALTER M. BERRY.
BY Joseph B. Gardner
ATTORNEY.

Reissued Oct. 27, 1931 Re. 18,235

UNITED STATES PATENT OFFICE

FREDERICK A. GERCICH, OF OAKLAND, AND WALTER M. BERRY, OF LOS ANGELES, CALIFORNIA, ASSIGNORS TO HAMMER-BRAY COMPANY, OF OAKLAND, CALIFORNIA, A CORPORATION OF CALIFORNIA

KINDLING BURNER INSTALLATION

Original No. 1,728,165, dated September 10, 1929, Serial No. 238,527, filed December 8, 1927. Application for reissue filed February 24, 1930. Serial No. 431,039.

The invention relates to an installation for gas kindling burners in solid-fuel fire boxes.

An object of the invention is to provide an installation of the character described in which the kindling burner is disposed entirely out of the combustion portion of the fire-box space whereby it may at all times be relatively cool and cannot be damaged by the combustion of solid fuel in the fire box.

Another object of the invention is to provide the necessary secondary air for a kindling burner for a fire-box from without the combustion portion of the fire box.

A feature of the invention is the provision of a novel means for supplying secondary air to a kindling burner of the nature and for the purpose described, arranged for the purpose of conducting, in the best possible manner, the proper amount of secondary air to the burner and subject to ready provision in or in connection with one of the walls of the fire box.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
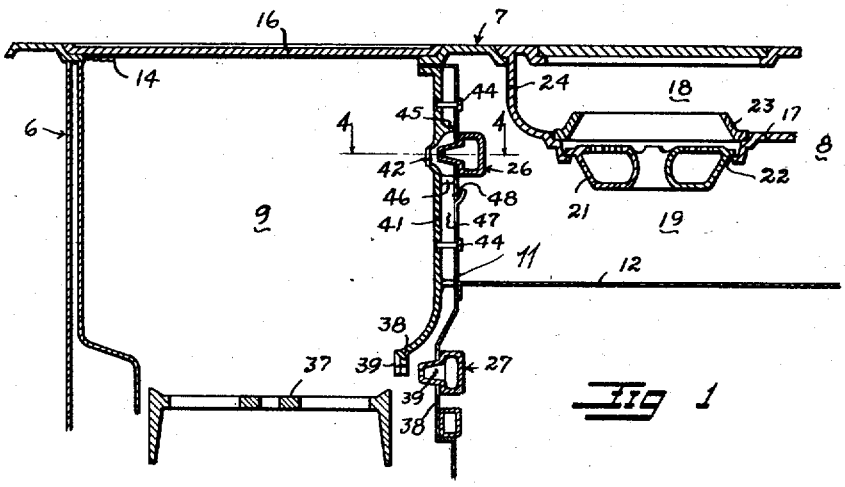
Figure 1 is a fragmentary sectional view through a stove structure embodying the invention.
Figure 2:
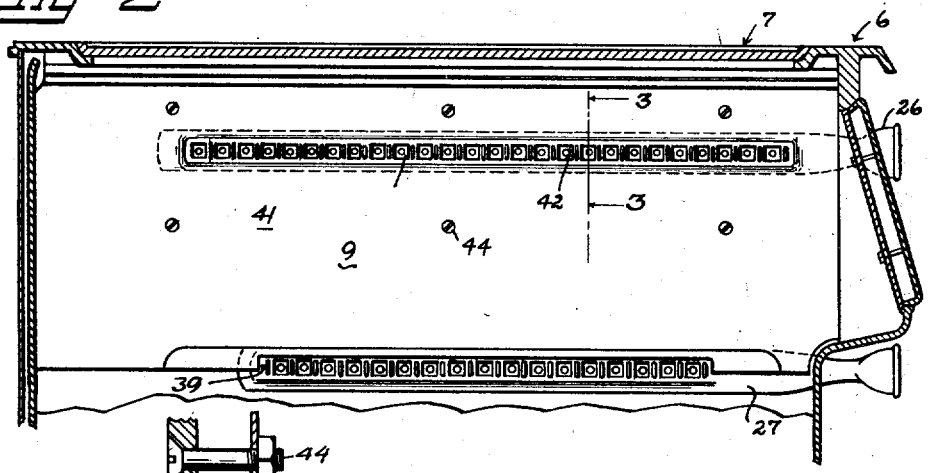
Figure 2 is a fragmentary side section taken through the fire box of the stove.
Figure 3:
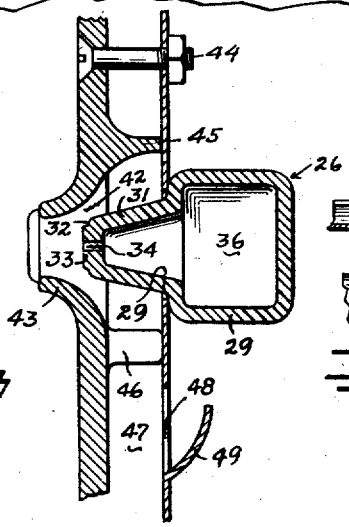
Figure 3 is an enlarged sectional view taken at the line 3—3 in Figure 2.
Figure 4:
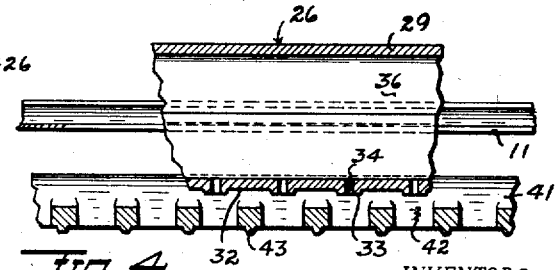
Figure 4 is an enlarged sectional view taken at the line 4—4 in Figure 1.

In its present embodiment, the installation of our invention is incorporated with a combination stove 6 having a cooking top 7 beneath a portion of which is defined a top-gas-burner chamber 8 and beneath another portion of which is defined a fire box 9 for solid fuel. The chamber 8 and fire box 9 are separated by a common wall 11, and the chamber 8 is defined above a bottom wall 12, while the cooking top portion above the fire-box is provided with an opening 14 in which a plate 16 is arranged to be removably mounted in a usual manner.

Preferably, the chamber 8 is divided generally horizontally by a member 17 to define a combustion compartment 18 above the member and immediately below the cooking top, and a fresh air supply compartment 19 constituting the remainder of the space of the chamber. Each top burner 21 is disposed generally in the compartment 19 and opposite an opening 22 in the member 17 whereby air in passing from the compartment 19 will be directed over the burner to provide the necessary secondary air supply therefor, conduit member 23 being shown mounted at each opening for guiding the air over the burner thereat. The member 17, it will now be noted, depends from the cooking top portion above the chamber 8 and is provided with an imperforate and substantially vertical side wall 24 at the edge thereof opposite the partition wall 11, the wall 24 being spaced somewhat from the wall 11 whereby the relatively cool fresh air compartment 19 extends the full height of the chamber adjacent the wall 11.

Upper and lower kindler burners 26 and 27 respectively are provided for the fire box. Preferably, and as shown, the upper burner 26 is disposed to extend horizontally above the plane of the horizontal wall 12 and with the manifold portion 28 thereof in the compartment 19. Extending horizontally toward and into the fire box from the burner 26 through a slot 29 in the wall 11 is a tapered rib portion 31 of the burner, which portion is preferably of uniform section throughout its length and extends horizontally substantially the full length of the fire box. The forward face 32 of the burner portion 29, it is noted, is formed to provide a series of rectangular nozzles 33 having jet openings 34 connecting with the manifold passage 36 of the burner. The burner 26, it will be noted, is particularly intended to be used both for igniting any solid fuel in the fire box and heating the overlying cooking top portion 16, and the jets of gas from the burner are directed generally horizontally for these purposes; whereby, when there is no solid fuel in the path of the jets, a horizontal sheet of fire may be provided beneath the cooking top.

The manifold portion of the lower burner 27 is also disposed without the fire-box space and at a level just above that of the fire-box grate 37 whereby gaseous fuel from the burner may be delivered directly into any solid fuel at the bottom of the fuel receiving space of the fire-box. This burner, it is noted, is formed generally as is the burner 26, and is here shown disposed generally inwardly of the latter burner with respect to the fire-box, a lower portion 38 of the wall being appropriately offset and provided with a slot 39 for the reception of the jet rib of the burner 27.

As is usual, fire resistant linings are provided for the sides of the fire-box, such linings including a lining member 41 for disposition opposite and forming in fact, a part of the wall 11. The member 41, it will be noted, is disposed generally inwardly of both of the burners 26 and 27 and extends substantially the full length of the fire-box and between the grate and cooking top. To provide for the projection of the flame jets from the burner 26 through the member 41, the latter is provided with a series of generally rectangular openings 42 opposite the burner nozzles 33 and in spaced relation therefrom. However, any other arrangement whereby the burner, preferably protected from the heat, but at all events arranged to direct the fuel into the fire box, may be resorted to as within the scope of this invention provided the novel secondary air feed provisions more particularly hereinafter described are employed in connection with the said burner. Preferably, and as shown, an outwardly extending flange 43 tapered in the manner of a nozzle is provided about the edge of each opening 42, whereby the openings provided in the lining member 41 are protected somewhat, particularly from above, from the entry of ashes or other solid materials therethrough, these openings also providing, in effect, conduits about the bases of the flame jets from the burner nozzles. As here shown, the member 41 is secured to the wall 11 by bolts 44, spaced projections 45 and 46 being provided on the member 41 for maintaining the proper spaced relation of the member and wall. As herewith particularly shown, the projection 45 is formed as a continuous rib overlying the slot 29 of the wall and extending the full length of the lining member whereby the space between the member and wall and above the burners is partitioned off. In the manner above referred to there is provided a passage or air space 47 in a side wall of the fire box proper for the express purpose of supplying secondary air to the burner.

It will now be noted that the relation of the burner nozzles 31 to the tapered openings 42 is such that as the gaseous fuel is discharged through the openings, air will be drawn from the air space 47 behind the lining member 41 and into the flame jets whereby it may serve as a secondary air supply for the jet. Such a supply is, of course, necessary for effecting a complete combustion of the fuel from the nozzles 31, and the relation between the nozzles 31 and member 41 is preferably such that substantially all of the necessary air for the purpose is provided through the openings 42. In this manner, combustion of the discharged fuel is insured regardless of the contents of the combustion space of the fire box, and no smothering of the flames of the jets is possible as might occur when solid fuel is being simultaneously consumed in the fire box.

With the present structure, air must of course be admitted to the space 47 defined between the member 41 and wall 11, and below the rib 45, and while the opening at the bottom of the member 41 might serve for the purpose, the draft created across the nozzles of the burner 27, when the burner 26 is in operation, would tend to interfere with proper combustion of fuel at such burner. Accordingly, the wall 11 is preferably provided with a longitudinally extending opening 48 adjacent the burner 26 whereby air for this burner may be drawn from the compartment 19 of the burner chamber 8. Preferably, and as shown, the opening 48 is formed by bending out of the plane of the wall a rectangular portion 49 thereof, such portion being left attached to the wall along one longitudinal edge and constituting a louver in effect. In this manner, a sufficient secondary air supply is insured for the burner 26 and the effective passage provided at the opening 48 may be adjusted in a simple manner by adjusting the angular relation of the louver 49 to the wall 11. However, when only the upper burner 26 is used, air will readily enter the opening 42 and pass upward in the passage 47 to the upper burner, and if the burners are to be operated independently the opening 48 may be dispensed with inasmuch as said opening 42 and the space 47 will effectively serve either burner.

It will now be seen that the kindling burner installation of this invention is primarily improved by supplying secondary air thereto and particularly through the use of a passage especially arranged to conduct an adequate supply of such secondary air to the burner in the best possible manner. By forming the said air passage in a wall of the fire box especially a side wall, provision is also made for conveniently associating the burner with said wall in such manner that the burner will be protected from the heat from the fire box, yet will most effectively inject fuel into the fire box and cause the mixture of secondary air with the fuel to insure proper combustion at all times.

We claim:

1. In combination with a fire-box for solid fuel, a gas burner disposed at a side of the fire box generally outwardly thereof and providing a nozzle for directing a stream of fuel into the fire box, a lining member disposed in front of said nozzle and having an opening opposite said nozzle to permit the discharge of said fuel stream therethrough, and means operative to provide from behind the member the secondary supply of air for effecting the combustion of the fuel of said stream within the combustion space of the fire box.

2. In combination with a fire box for solid fuel, a gas burner disposed at a side of the fire box and providing a nozzle, and a lining member disposed in front of said burner and provided with an opening opposite said nozzle and in spaced relation therefrom whereby a stream of fuel passing from said nozzle through said opening will draw the secondary air supply for the combustion of said fuel through said opening from behind said lining member.

3. In combination with a fire box for solid fuel, a gas burner disposed longitudinally along a side of the fire box and providing a row of nozzles for projecting gaseous fuel into the fire box, and a lining member disposed in front of said burner and provided with openings opposite said nozzles to permit a free discharge of fuel therethrough, said openings being formed to provide conduits for directing a secondary supply of air from behind said lining member and into said stream.

4. In combination with a stove having a solid fuel fire box and a top gas burner chamber separated by a common wall, a kindler burner disposed adjacent said wall and providing a nozzle for directing a stream of fuel into the fire box, a lining member in said fire box disposed in front of said nozzle and perforated to permit the passage of said fuel stream therethrough, and means operative to provide from said chamber the necessary secondary supply of air for effecting the combustion of the fuel of said stream within the combustion space of the fire box.

5. In combination with a stove having a solid fuel fire box and a top gas burner chamber separated by a common wall, a kindling burner disposed generally within said chamber and having a nozzle portion thereof extending through said wall into said fire box, a lining member in said fire box disposed opposite said wall and burner nozzle portion in spaced relation therefrom and perforated opposite said nozzle portion to permit the passage therethrough of fuel from said nozzle portion, means operative to provide from the space between said member and said wall the necessary secondary supply of air for effecting the combustion of said fuel within the combustion space of the fire box, and means operative to supply said space with air from said chamber.

6. In combination with a stove having a solid fuel fire box and a top gas burner chamber separated by a common wall, a kindling burner disposed in said chamber and arranged to discharge gaseous fuel through said wall into said fire box, and means operative to provide from said chamber a secondary supply of air for effecting the combustion of said fuel in the fire box.

7. In combination with a stove having a solid fuel fire box and a top gas burner chamber separated by a common wall and disposed beneath coterminous portions of the cooking top of the stove, means dividing said burner chamber to provide a combustion compartment immediately below the overlying cooking top portion, a lining member in said fire box disposed along said wall in spaced relation therefrom, and a kindler burner disposed in said chamber without said combustion compartment and arranged to discharge gaseous fuel through said wall and lining member into the combustion space of the fire box, said wall and lining member being provided with openings through which a secondary supply of air for said fuel in said fire box is arranged to be drawn from said chamber.

8. In a stove, a solid fuel fire box, a burner arranged to discharge gaseous fuel into said fire box, and a wall at a side of the fire box having a vertical air passage within the confines thereof and opening laterally therethrough into the fire box and arranged to receive air from a point without the combustion space of the fire box and to conduct said air to said burner to support combustion of said gaseous fuel.

9. In a stove having a cooking top, a solid fuel fire box, a burner for gaseous fuel located beneath and within the confines of the cooking top and arranged to provide a flame in said fire box whereby to heat said top, and a wall at a side of the fire box and within the confines of said top for providing a secondary air passage arranged to receive air from a point without the combustion space of the fire box and to direct such air to the point of combustion of the gaseous fuel in said fire box, said burner being arranged to discharge gaseous fuel through a part of said passage and into said fire box.

10. In a stove, a solid fuel fire box, a double wall structure associated with the fire box and a gaseous fuel burner arranged to be protected from the heat of the fire box by said wall structure and to provide a flame in the fire box, said wall structure providing a secondary air passage between the two walls thereof, said passage opening laterally into said fire box and conducting air to the point of and to support combustion of the gaseous fuel in said fire box, said burner being located on the outside of the wall structure and having a portion thereof extended into the laterally open end of the passage.

11. In a stove, a solid fuel fire box, a double wall structure in association with the fire box and providing between said walls a secondary air passage having a laterally extended discharge outlet opening into the fire box, and a gaseous fuel burner providing through the instrumentality of said outlet a flame in said fire box for directly heating the top thereof.

12. In a stove, a solid fuel fire box, a double wall structure in association with the fire box and providing therein a secondary air passage having a discharge outlet opening into the fire box, and a gaseous fuel burner located to one side of the wall structure and having a portion thereof disposed in said passage and providing through the instrumentality of said outlet a flame in said fire box for directly heating the top thereof.

In testimony whereof, we have hereunto set our hands at Oakland and Los Angeles, California, respectively, on Jan. 30th, 1930, and Feb. 7th, 1930.

FREDERICK A. GERCICH.
WALTER M. BERRY.